United States Patent

[11] 3,624,629

| [72] | Inventor | Charles A. Donaldson |
| | | Del Rio, Tex. |
| [21] | Appl. No. | 771,948 |
| [22] | Filed | Oct. 30, 1968 |
| [45] | Patented | Nov. 30, 1971 |
| [73] | Assignees | Wesley Green; |
| | | J. D. Cavaness |
| | | , part interest to each |

[54] WARNING SYSTEM FOR WARNING OF DEFECTIVE HEADLIGHTS, TAILLIGHTS AND THE LIKE ON MOTOR VEHICLES, AIRCRAFT, MARINE CRAFT AND THE LIKE
2 Claims, 4 Drawing Figs.

[52] U.S. Cl. .................................................. 340/251,
315/130, 331/64, 331/117, 331/172, 340/331
[51] Int. Cl. ....................................................... H05b 37/03
[50] Field of Search ............................................. 340/80, 81, 331, 251, 252

[56] References Cited
UNITED STATES PATENTS

| 2,719,288 | 9/1955 | Young | 340/251 |
| 3,311,779 | 3/1967 | Hartkorn | 340/256 X |
| 3,355,601 | 11/1967 | Klein | 340/251 UX |
| 3,421,157 | 1/1969 | Atkins | 340/251 |

*Primary Examiner*—John W. Caldwell
*Assistant Examiner*—Kenneth N. Leimer
*Attorney*—Pravel, Wilson & Matthews ABSTRACT: In one embodiment, an oscillator circuit is used to drive a warning light which is located on the dashboard of the vehicle. One winding of a coil device having a saturable core is connected in series in the direct current supply circuit for the vehicle lights, while a second winding is included in an oscillation-determining portion of the oscillator circuit. Proper flow of direct current to the vehicle lights saturates the core and disables the oscillator. Improper operation of one of the vehicle lights takes the core out of saturation and enables the oscillator to energize the warning light circuit. In another embodiment, the oscillator signal is supplied by way of a tuned amplifier circuit to the warning light and the saturable core device is used to detune a tuned circuit in the amplifier when the warning light should not be lit.

Charles A. Donaldson
INVENTOR

BY
Hayden Pravel Wilson & Matthews
ATTORNEYS

Charles A. Donaldson
INVENTOR

BY
Hayden Pravel Wilson & Matthews
ATTORNEYS 3,624,629

WARNING SYSTEM FOR WARNING OF DEFECTIVE HEADLIGHTS, TAILLIGHTS AND THE LIKE ON MOTOR VEHICLES, AIRCRAFT, MARINE CRAFT AND THE LIKE

BACKGROUND OF THE INVENTION

This invention relates to warning systems for motor vehicles, aircraft, marine craft and other forms of transportation for warning the operator of a malfunction in the vehicle equipment.

The number of motor vehicles, aircraft and the like in present day use is relatively large and is continuing to increase. This, together with the fact that these vehicles and craft are frequently operated at relatively high speeds, places increased emphasis and importance on improving the safety features of such vehicles and craft. Much progress has been made in this area in recent years.

It is believed that a further improvement in the safety of operation of motor vehicles and the like can be made by providing the vehicle with a warning system for warning the operator when one or more of the vehicle headlights, taillights or other exterior warning lights becomes defective. Take, for example, the case of a motor vehicle operating on a high-speed expressway or interstate highway at night. Suppose that the taillights of such vehicle should become defective and cease to operate. Such an occurrence would considerably increase the probability that a second motor vehicle coming up from behind would not see the first vehicle in time to avoid a collision. And yet the operator of the first vehicle would not be aware of his dangerous predicament. He would not know that his taillights were defective.

Other situations can be readily visualized. For example, when driving during the twilight hours as the sun is setting, it is a good safety practice to turn on one's headlights. At such time, however, it is not yet sufficiently dark to enable the operator of the vehicle to see that his lights are on. A similar type of situation frequently occurs when driving on lighted city streets. In these cases, a light failure warning system would be very useful.

SUMMARY OF THE INVENTION

It is an object of the invention, therefore, to provide a new and improved warning system for warning the operator of defective headlights, taillights and the like on motor vehicles, aircraft, marine craft and the like.

It is another object of the invention to provide a new and improved light failure warning system for motor vehicles and other forms of transportation which is of a durable, reliable, and relatively inexpensive form of construction.

In accordance with the invention, there is provided a warning system for motor vehicles, aircraft, marine craft and the like, having an electric light and current supply means for energizing such light, the warning system acting to warn the operator when the light becomes defective. Such warning system comprises a warning device and current-sensitive circuit means coupled to the current supply means of the vehicle or craft for actuating the warning device when the current supply means is connected to the vehicle or craft light but an improper amount of current is being drawn by such light.

For a better understanding of the present invention, together with other and further objects and features thereof, reference is had to the following description taken in connection with the accompanying drawings, the scope of the invention being pointed out in the appended claims.

BRIEF DESCRIPTION OF THE DRAWINGS

Referring to the drawings.

DESCRIPTION OF THE FIRST EMBODIMENT

Figure 1:
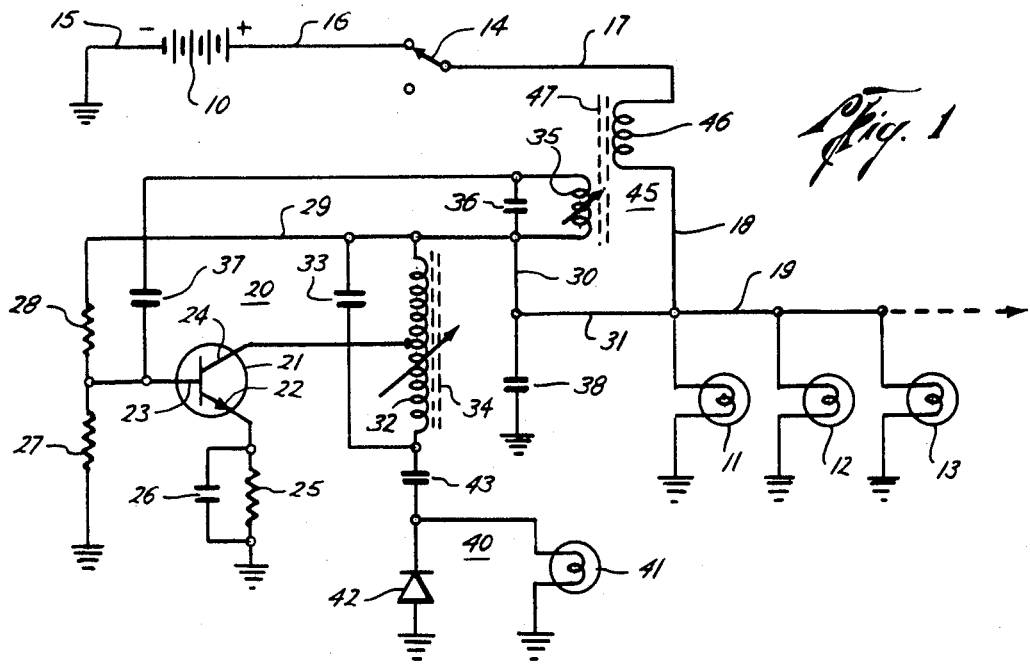
FIG. 1 is an electrical circuit diagram of a first embodiment of a light failure warning system constructed in accordance with the present invention.

Referring to FIG. 1, there is shown a light failure warning system as applied by way of example to the case of a motor vehicle. Battery 10 corresponds to the storage battery normally located on a motor vehicle, while light bulbs 11, 12, and 13 represent the bulbs or lamps included in some of the headlights, taillights and so forth of the motor vehicle. For simplicity, only three lamps are shown in FIG. 1, it being understood that a greater number may be present in actual practice. A switch 14 represents the switch for turning the vehicle lights on and off. The direct current circuit normally included on the vehicle for supplying battery current to the vehicle lights 11–13 includes a conductor 15 for grounding one side of the battery 10 to the vehicle body, a conductor 16 for connecting the other side of the battery 10 to a first side of the switch 14 and conductors 17, 18, 19 and so forth for connecting the other side of the switch 14 to first terminals of the vehicle lights 11–13, the other terminals of these lights being grounded to the body or frame of the vehicle.

The warning system includes alternating-current circuit means for providing an alternating-current signal. In the present embodiment, this circuit means takes the form of an oscillator circuit 20 which is of the tuned-base tuned-collector type. Oscillator 20 includes an NPN-type transistor 21 having an emitter electrode 22, a base electrode 23 and a collector electrode 24. Connected to the emitter electrode 22 is an emitter-biasing network which includes a resistor 25 and a capacitor 26. Connected between the base electrode 23 and circuit ground is a resistor 27. A second resistor 28 is connected between the base electrode 23 and a voltage supply conductor 29. Conductor 29 is, in turn, connected by way of conductors 30 and 31 to the conductor 18 of the direct current battery circuit. The voltage supply conductor 29 thus receives its energy from the vehicle battery 10 whenever the light switch 14 is closed. Resistors 27 and 28 form a voltage divider and are proportioned to provide the proper operating bias for the base electrode 23. Connected to the collector electrode 24 is a first tuned circuit formed by a variable inductor 32 and a capacitor 33 connected in parallel therewith. The inductor 32 is provided with a ferrite core 34. A second turned circuit is connected to the base electrode 23. This second tuned circuit includes a variable inductor 35 and a capacitor 36 connected in parallel therewith. One end of this parallel combination is connected to the voltage supply conductor 29, while the other end is coupled by way of a direct current blocking capacitor 37 to the base electrode 23. An alternating-current bypass capacitor 38 is connected between the junction of voltage supply conductors 30 and 31 and circuit ground.

The warning system also includes warning circuit means 40 responsive to the alternating-current signal produced by the oscillator 20 for producing a warning signal. This warning circuit means 40 includes a warning device in the form of a lamp 41, a diode 42 connected in parallel therewith and a capacitor 43 connected between the upper end of this parallel combination and the lower end of the inductor 32. The warning lamp 41 will normally be mounted on the dashboard of the vehicle in easy view of the operator.

The warning system further includes current-sensitive circuit means represented by a coil device 45 which is coupled to both the direct current circuit for the vehicle light 11–13 and the alternating-current circuit means represented by the oscillator 20. This coil device 45 includes a first inductor winding 46 which is connected in series intermediate the conductors 17 and 18 in the direct current circuit for the vehicle lights 11–13. The coil device 45 also includes a second inductor winding which is connected in the oscillator circuit 20. This second inductor winding is represented by the inductor 35 which constitutes the inductance of the base electrode tuned circuit. The coil device 45 further includes a saturable ferrite core 47 which passes through both the inductor winding 35 and the inductor winding 46.

Considering now the operation of the warning system shown in FIG. 1, it is assumed that the variable inductors 32 and 35 have been adjusted so that the collector and base-tuned circuits are tuned to the same frequency. When the light switch 14 is closed so as to turn on the vehicle lights 11-13, this also supplied direct current operating voltage to the oscillator circuit 20. Such operating voltage is supplied by way of conductors 31, 30 and 29. Assuming for the moment that the vehicle lights 11-13 are all defective such that none of them is drawing any current, then the oscillator circuit 20 is free to oscillate. The feedback action which causes the circuit to oscillate is provided by means of the inherent collector-to-base coupling of the transistor 21.

When the oscillator circuit 20 is oscillating, the alternating-current signal developed across the collector-tuned circuit formed by inductor 32 and capacitor 33 operates to energize the warning circuit 40 and thus to turn on the warning lamp 41. At this time, the diode 42 and capacitor 43 operate in the manner of a rectifier circuit for boosting the value of the energizing voltage applied to the warning lamp 41, the direct current voltage charge built up across the capacitor 43 because of the rectifying action serving to augment the voltage applied to the warning lamp 41 during the half-cycles when the diode 42 is nonconductive.

Assume now that the vehicle lights 11-13 are in good working order and that each is drawing the proper current. In this case, the flow of direct current for the lights 11-13 through the inductor winding 46 acts to saturate the ferrite core 47. This changes the inductance of the inductor winding 35 and, hence detunes the base electrode tuned circuit formed by this inductor winding 35 and the capacitor 36. This causes the oscillator circuit 20 to stop oscillating. As a consequence, no alternating-current voltage is applied to the warning circuit 40. This causes the warning lamp 41 to go out. At this time, the capacitor 43 prevents any direct current from reaching the lamp 41.

The preferred manner of operation is such that if all the vehicle lights 11-13 (and any others which may be connected in parallel therewith) are operating properly and are drawing the proper value of direct current, then the core 47 is saturated, the oscillator 20 is disabled and the warning lamp 41 is turned off. If, on the other hand, one of the vehicle lights 11-13 (or any others connected in parallel therewith) should become defective such that it does not draw any direct current, then the change in direct current flow through the inductor winding 46 is such that the core 47 is no longer saturated and the oscillator circuit 20 is free to oscillate, thus turning on the warning lamp 41. This manner of operation is accomplished by the proper selection of the number of turns on the inductor winding 46. In particular, the number of turns around the core 47 for the winding 46 is selected so that if one of the vehicle lights is not drawing current, then the core 47 is no longer saturated, while if all the vehicle lights are drawing current the core 47 is saturated. Thus, the FIG. 1 system can be made to accommodate different numbers of vehicle lights and different lamp sizes or ratings by varying the number of turns on the inductor winding 46.

As indicated, the FIG. 1 system provides one warning lamp for all of the vehicle lamps that it is desired to monitor. If desired, however, the system of FIG. 1 can be modified to provide a separate warning lamp for each of the vehicle lights. This is accomplished by providing a separate oscillator circuit (like 20), a separate warning circuit (like 40) and a separate saturable core coil device (like 45) for each of the vehicle lights. Such a system would, or course, be more expensive and, perhaps, may be economically justifiable only for the case of commercial-type vehicles.

DESCRIPTION OF THE SECOND EMBODIMENT

Figure 2:
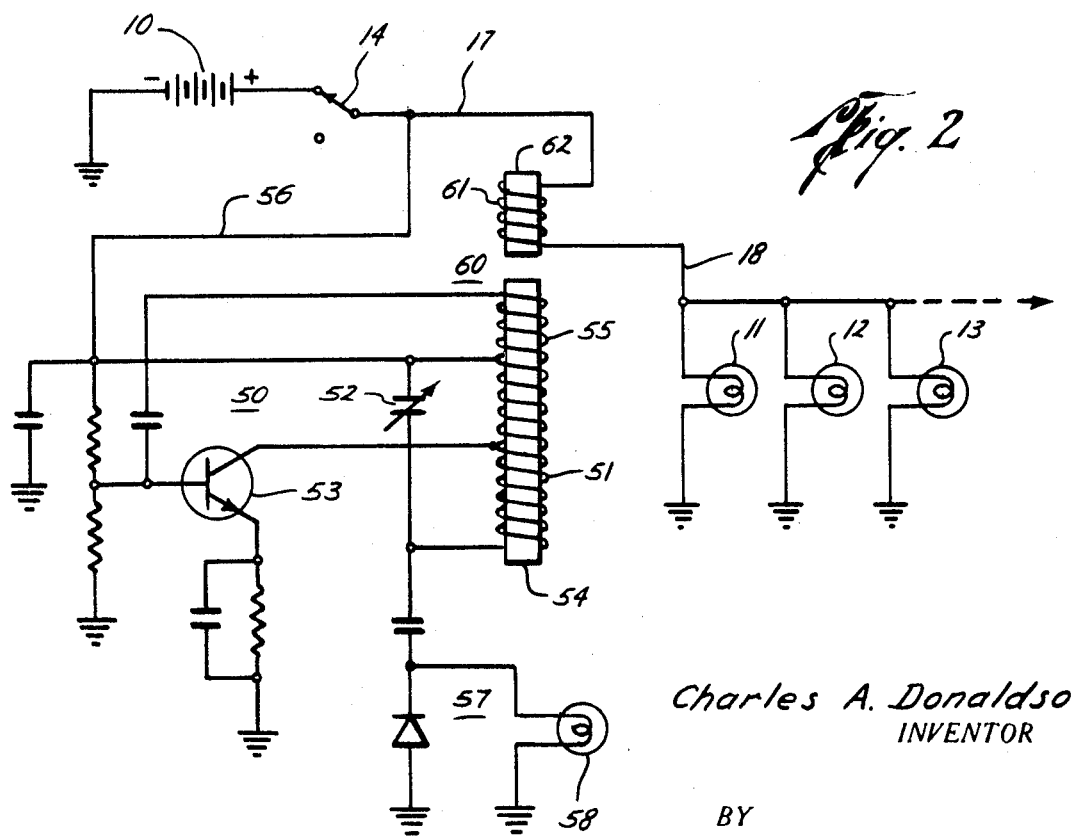
FIG. 2 is a circuit diagram of a second embodiment of the invention.

Referring now to FIG. 2, there is shown a second embodiment of the light failure warning system. The vehicle battery, vehicle lights and the direct current circuit connecting these elements are identified by the same reference numerals as in FIG. 1. The FIG. 2 warning system includes an oscillator circuit 50 of the tuned-collector type. The tuned circuit is formed by an inductor 51 and a variable capacitor 52 and is connected to the collector of a transistor 53. Inductor 51 is provided with a saturable ferrite core 54. The feedback necessary to sustain circuit oscillation is provided by a feedback inductor 55 which is also wound on the core 54 and is coupled to the base electrode of the transistor 53. Supply voltage for energizing the oscillator circuit 50 is supplied thereto by way of a conductor 56. A warning circuit 57 including a warning lamp 58 is connected to the lower end of the tuned circuit inductor 51. A current-sensitive coil device 60 is provided which includes the core 54, the inductor windings 51 and 55, an inductor winding 61 connected in series in the direct current circuit running to the vehicle lights 11-13 and a ferrite core 62 which is provided for the inductor winding 61. Mechanical adjustment means (not shown) are provided for adjusting the physical spacing between the adjacent ends of the cores 54 and 62.

When the light switch 14 is closed and all of the vehicle lights 11—(and any others connected in parallel therewith) are operating properly, then the magnetic flux field produced by the flow of direct current through the inductor winding 61 is sufficient to saturate the core 54 associated with the oscillator circuit 50. This reduces the amount of feedback provided by way of the feedback coil 55 to such a value that the oscillator circuit 50 will not oscillate. This keeps the warning lamp 58 turned off.

If one of the vehicle lights 11-13 (and others) becomes defective, then the change in flow of direct current through the inductor winding 61 is such that the strength of the resulting magnetic field is reduced to the point where the oscillator core 54 is no longer saturated. This enables the oscillator circuit 50 to oscillate and, hence, to turn on the warning lamp 58.

In this embodiment, the point at which the oscillator core 54 becomes saturated can be adjusted by varying the physical spacing between the cores 54 and 62. This spacing is adjusted so that saturation occurs when all of the vehicle lights are operating properly, but does not occur when one of the lights become defective. For some applications, this manner of adjustment will be easier to implement than providing for adjustment of the number of turns which are used to form the inductor winding which is connected in series in the direct current circuit for the vehicle lights. It is, of course, also possible to provide for adjustment of both the core spacing and the number of inductor turns in the vehicle light circuit.

DESCRIPTION OF THE THIRD EMBODIMENT

Figure 3:
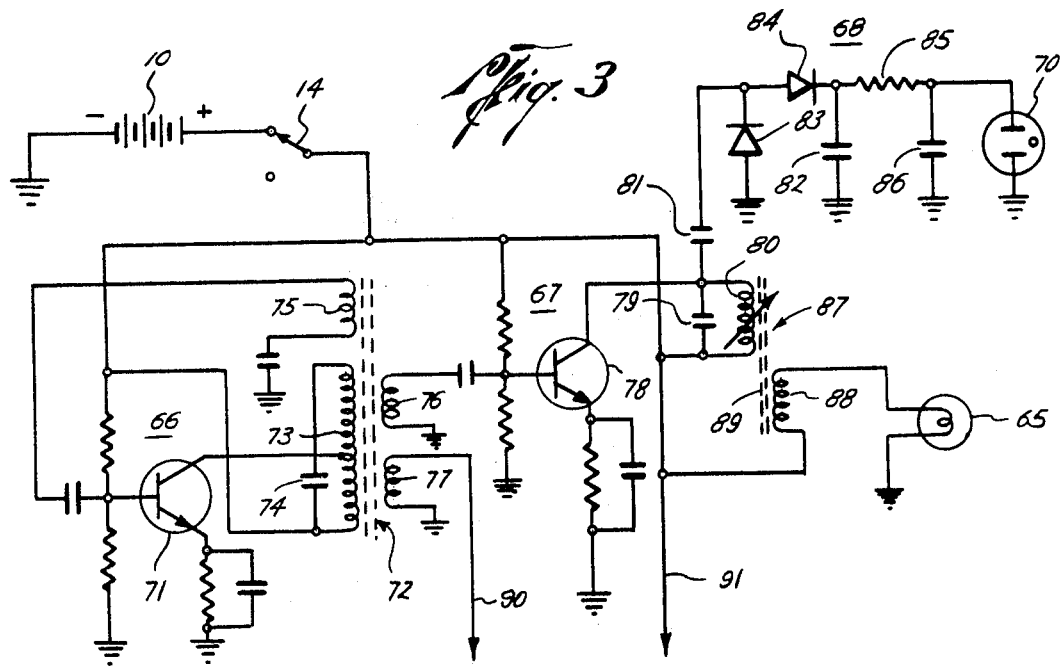
FIG. 3 is a circuit diagram of a third embodiment of the invention.

Referring now to FIG. 3, there is shown a third embodiment of a defective light warning system constructed in accordance with the present invention. The vehicle battery is indicated at 10, while the switch for turning the vehicle lights on and off is indicated at 14. One of the vehicle lights is indicated at 65. This warning system includes an oscillator circuit 66 for generating an alternating-current signal of predetermined frequency, a tuned amplifier circuit 67 tuned to this same frequency and a warning circuit 68 including a warning lamp 70 for indicating when the vehicle light 65 has become defective.

The oscillator circuit 66 is of the tuned-collector type and includes a transistor 71 and a transformer 72. A first winding 73 of the transformer 72, together with a capacitor 74, forms the tuned circuit which is connected to the collector of the transistor 71. A second winding 75 provides the oscillator feedback signal which is fed back to the base electrode of the transistor 71. The transformer 72 includes a series of secondary type windings (one for each vehicle light), two of which are indicated at 76 and 77. A first of these windings 76 constitutes the input to the amplifier circuit 67, which amplifier circuit includes a transistor 78 and a tuned circuit formed by a capacitor 79 and an inductor 80. This tuned circuit constitutes the collector load of the transistor 78. This tuned circuit is tuned to the same frequency as the frequency of oscillation of the oscillator circuit 66.

The warning circuit 68 includes a voltage-doubling rectifier circuit formed by capacitors 81 and 82 and diodes 83 and 84. The input side of this rectifier circuit is connected to the collector electrode of the amplifier circuit transistor 78. The warning circuit 68 further includes an RC time constant circuit formed by a resistor 85 and a capacitor 86. This RC time constant circuit is connected in series between the voltage-doubling rectifier circuit and the warning lamp 70 which, in this embodiment, is in the form of a neon-filled gaseous discharge lamp.

In this embodiment the current-sensitive saturable core means is indicated at 87. It includes an inductor winding 88 which is connected in series in the direct current circuit for the vehicle lamp 65, the inductor 80 of the amplifier tuned circuit and a saturable ferrite core 89 which is common to both the inductor windings 80 and 88.

The amplifier circuit 67, warning circuit 68 and saturable core means 87 operate in conjunction with only a single one of the vehicle lights, namely, the one indicated at 65. Additional amplifier circuits, warning circuits and saturable core means are provided for each of the other vehicle lights which it is desired to monitor. A second of these additional amplifier circuits would be connected to a conductor 90 leading from the transformer secondary winding 77. Additional secondary windings would be provided for the remainder of the vehicle lights. Operating voltage for the additional amplifier circuits, as well as for the additional vehicle lights, is obtained by making connection to a conductor 91 which is connected to the vehicle battery 10 by way of the switch 14.

Considering now the operation of the FIG. 3 embodiment, when the light switch 14 is closed for purposes of turning on the vehicle light 65, this also supplies operating voltage to the oscillator circuit 66 and the amplifier circuit 67 (as well as any additional amplifiers). As long as the switch 14 is closed, the oscillator circuit 66 is always oscillating. The alternating-current signal provided by this oscillator circuit 66 is supplied to the input of the amplifier circuit 67. If the vehicle light 65 is defective, then the amplifier circuit 67 operates to amplify this alternating-current signal and thus to produce an amplified version thereof across the tuned circuit formed by inductor winding 80 and capacitor 79.

This amplified signal is used to drive the voltage-doubling rectifier and thus to develop across the rectifier capacitor 82 a voltage which is approximately equal to twice the peak value of the alternating-current signal. This rectified voltage is applied to the RC time constant circuit formed by resistor 85 and capacitor 86, which, together with the neon lamp 70, forms a relaxation oscillator. As a result, as long as sufficient rectified voltage is present across the capacitor 82, the neon lamp 70 flashes on and off at a rate determined by the RC time constant circuit as well as the breakdown voltage value of the neon lamp 70. This flashing of the lamp 70 indicates that the vehicle light 65 is defective.

If the vehicle light 65 is functioning properly and is drawing the proper value of direct current, then the flow of direct current through the inductor winding 88 serves to saturate the core 89. This, in turn, detunes the tuned circuit formed by inductor winding 80 and capacitor 79 to a point such that the resulting rectified voltage appearing across the rectifier capacitor 82 is less than the breakdown voltage of the neon lamp 70. As a consequence, the neon lamp 70 remains off and does not flash.

The additional amplifier circuits and their cooperating vehicle lights work in a similar manner. Since a separate amplifier circuit, current-sensitive saturable core element and warning lamp is provided for each of the vehicle lights, it is then possible to know precisely which vehicle light has become defective. The various neon warning lamps are mounted in a convenient location on the vehicle dashboard.

DESCRIPTION OF THE FOURTH EMBODIMENT

Figure 4:
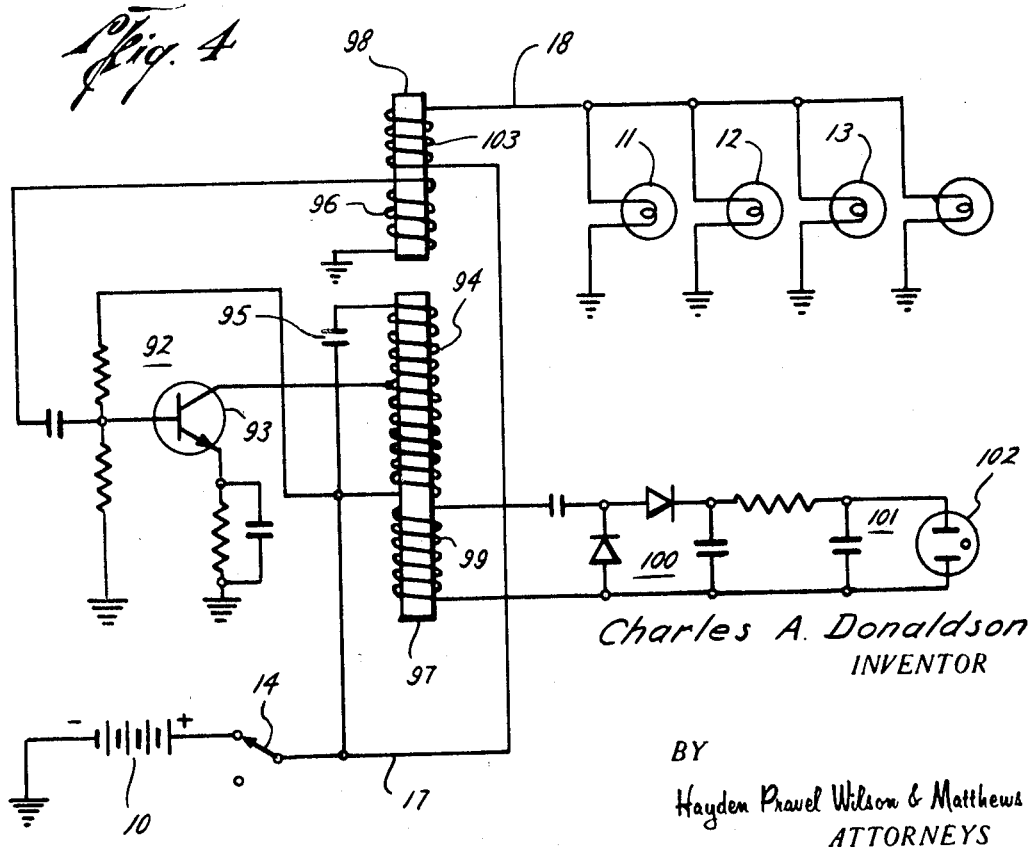
FIG. 4 is a circuit diagram of a fourth embodiment of the invention.

Referring now to FIG. 4, there is shown a further embodiment of a defective light warning system constructed in accordance with the present invention. This system includes a tuned-collector type of oscillator circuit 92 having a transistor 93 and a tuned-collector circuit formed by an inductor 94 and a capacitor 95. Coupled to the inductor 94 is a feedback winding 96 which supplies a feedback signal back to the base electrode of the transistor 93 to produce the circuit oscillations. Inductor 94 is located on a first ferrite core member 97, while the inductor winding 96 is located on a second ferrite core member 98. These core members 97 and 98 are mechanically mounted so that the spacing between the adjacent ends of these core member may be adjusted or varied. The main core 97 also includes a further inductor winding 99 wound thereon for purposes of supplying the alternating-current signal produced by the oscillator circuit 92 (when the oscillator is oscillating) to a voltage-doubling rectifier circuit 100. The rectified voltage appearing at the output of the rectifier circuit 100 is supplied to a relaxation oscillator circuit 101 which includes a neon lamp 102.

A further inductor winding 103 is provided on the feedback core 98. This winding 103 is connected in series in the direct current circuit running from the light switch 14 to the vehicle lights 11–13 (and any other).

If all of the vehicle lights 11–13 (and others) are operating properly, then the direct current flowing through the inductor winding 103 is so strong that the cores 97 and 98 are saturated. As a consequence, there is not enough feedback to sustain oscillation of the oscillator circuit 92. If this event, the neon lamp 102 remains off and does not flash. If on the other hand, one of the vehicle lamps 11–13 (and others) becomes defective, then the decrease in direct current flow through the inductor winding 103 is sufficient to take the cores 97 and 98 out of saturation to a sufficient extent to enable enough feedback by way of the feedback winding 96 to enable the oscillator circuit 92 to oscillate. The resulting alternating-current oscillator signal is then supplied by way of the secondary winding 99 to the voltage-doubling rectifier circuit 100. The resulting rectifier voltage drives the relaxation oscillator circuit 101 and thereby causes the neon warning lamp 102 to flash on and off.

In this embodiment, the physical spacing between the feedback core 98 and the main core 97 is adjusted to take into account the number and sizes of the vehicle lights which are to be monitored by the warning system. The adjustment is set such that oscillation will occur when the vehicle light drawing the least amount of current becomes defective. The fact that the adjustment of the core spacing also varies the feedback factor helps give better control of the "on-off" point for the oscillator circuit 92.

While there have been described what are at present considered to be preferred embodiments of this invention, it will be obvious to those skilled in the art that various changes and modifications may be made therein without departing from the invention, and it is, therefore, intended to cover all such changes and modifications as fall within the true spirit and scope of the invention.

What is claimed is:

1. A warning system for motor vehicles, aircraft, marine craft and like means for transportation for warning the operator when a vehicle or craft light becomes defective comprising:
   a. At least one electric light located on such means for transportation;
   b. direct current circuit means for supplying direct current to such light for turning it on;
   c. alternating-current circuit means for providing an alternating-current signal;

d. warning circuit means responsive to the alternating-current signal for producing a warning signal, comprising:
  1. voltage-doubling rectifier means for producing a rectified voltage from the alternating-current signal;
  2. relaxation oscillator means, including a gaseous discharge lamp, responsive to the rectified voltage for producing a visible flashing warning signal and
e. current-sensitive saturable core circuit means coupled to both the direct current circuit means and the alternating-current circuit means and responsive to the flow of a direct current for controlling the magnitude of the alternating-current signal supplied to the warning circuit means whereby the warning signal is not produced so long as the electric light is drawing a proper amount of direct current.

2. A warning system for motor vehicles, aircraft, marine craft and like means for transportation warning the operator when a vehicle or craft light becomes defective comprising:
a. at least one electric light located on such means for transportation;
b. a direct current circuit connected to the electric light and including a direct current voltage source and switch means for turning the light on and off;
c. an oscillator circuit for generating an alternating-current signal of predetermined frequency;
d. amplifier circuit means including an inductor-capacitor circuit tuned to the predetermined oscillator frequency for amplifying the alternating-current signal;
e. A warning device;
f. circuit means coupled to the warning device and to the amplifier circuit means and responsive to the amplified alternating-current signal for actuating the warning device;
g. Inductor means connected in series in the direct current circuit on the light side of the switch;
h. and saturable core means located in operative relationship with the inductor means in the direct current circuit and the inductor in the amplifier tuned circuit for detuning the tuned circuit for decreasing the magnitude of the amplified alternating-current signal below the value needed for actuating the warning device so long as the electric light is drawing a proper amount of current.

* * * * *